RICHARD J. BECHERER
GEORGE B. PARRENT, JR.
THOMAS J. SKINNER
INVENTORS

BY ALFRED H. ROSEN
AND JOHN H. COULT

ATTORNEYS

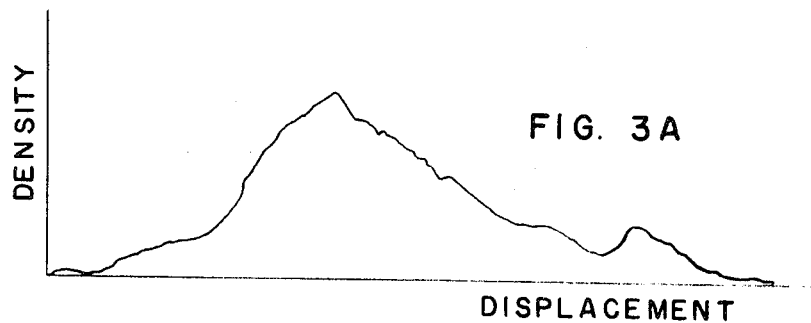
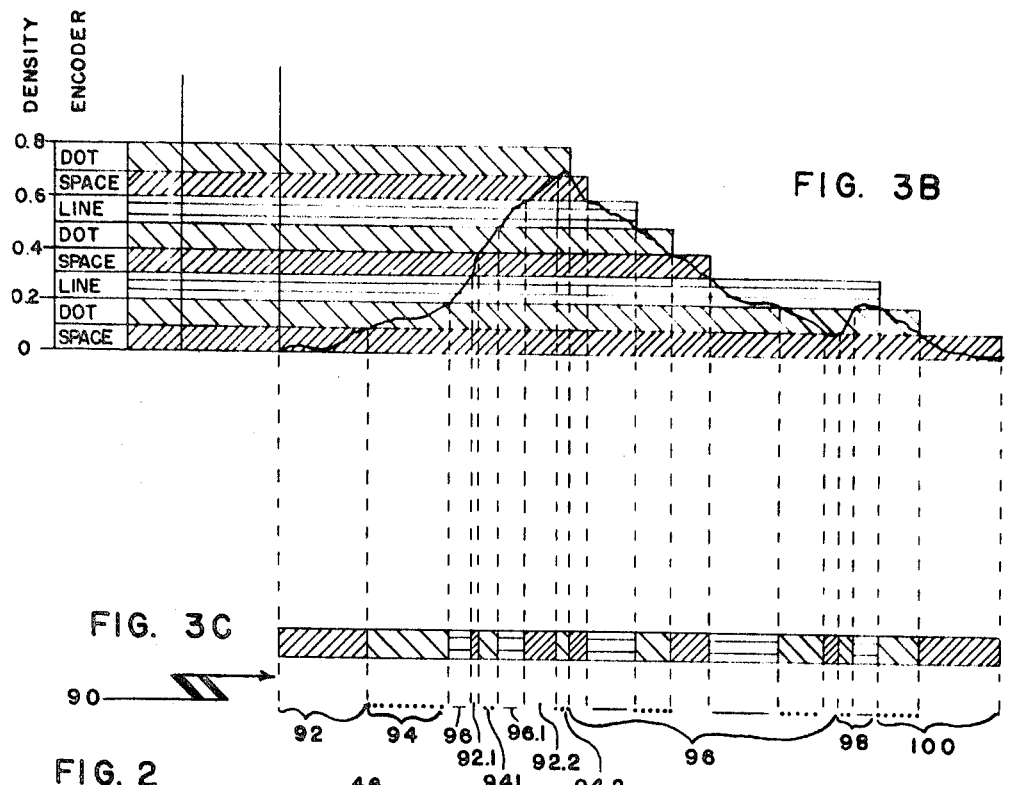
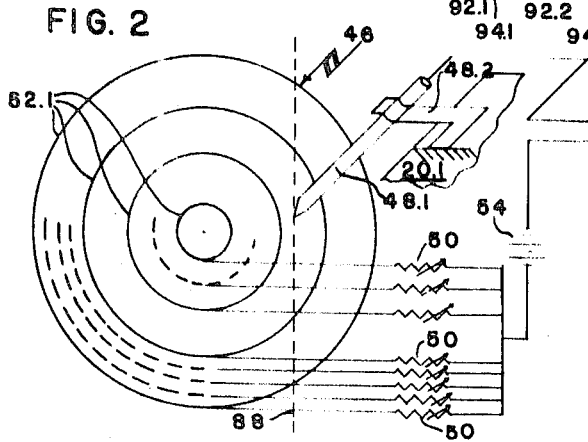

United States Patent Office 3,606,551
Patented Sept. 20, 1971

3,606,551
OPTICAL FILTERING METHODS AND STRUCTURES FOR INCREMENTAL SCANNING SYSTEMS
Richard J. Becherer, Chelmsford, George B. Parrent, Jr., Carlisle, and Thomas J. Skinner, Chelmsford, Mass., assignors to Technical Operations, Incorporated, Burlington, Mass.
Filed Apr. 15, 1968, Ser. No. 721,472
Int. Cl. G01n 21/06, 21/22
U.S. Cl. 356—203                    6 Claims

ABSTRACT OF THE DISCLOSURE

This disclosure depicts a method for producing isophote records from a photographic transparency record or the like. The disclosure further depicts novel apparatus for assisting in practicing the described method, comprising a microdensitometer for optically scanning a specimen carrying information in terms of density differences combined with a write-out device responsive to the microdensitometer for forming an isophote record characterizing the density variations in the scanned specimen. The disclosure emphasizes linear filtering methods and structures for use in microdensitometry with particular attention to scanning aperture filters having transmittance functions optimized to accomplish desired filtering operations. An exemplary filter for suppressing grain noise is shown.

CROSS REFERENCE TO RELATED APPLICATION

This application discloses subject matter comprising the invention of Carlton S. Miller et al., described and claimed in copending application Ser. No. 372,239, filed June 3, 1964.

BACKGROUND OF THE INVENTION

It is often desirable to alter a given information-bearing function in order to emphasize some predetermined characteristic of the function. Framed in an optical context, it is often desirable to operate on a given object function in such a way as to produce an image function which exhibits a maximum amount of information about some characteristic of the object function. In the past such attempts have been limited to linear optical filtering in a frequency (Fourier) plane formed with the aid of an optical imaging system. A. Marachal, for example, in Patent No. 3,090,281, has applied linear system analysis to optical imaging systems, teaching the use of Fourier transformation and spatial filtering in frequency space to produce images with enhanced high frequency content.

OBJECTS OF THE INVENTION

It is an object of this invention to provide filtering methods and structures, especially for incremental scanning optical systems.

It is another object of this invention to provide linear filtering methods and structures for operating on a given optical input to achieve a desired output in such a way that the root mean square of the deviation of the actual output from the desired output is minimized.

It is an object of this invention to provide filtering methods and filters applicable to distance space (as opposed to frequency space) in a scanning microdensitometer to produce an output optimized for a predetermined characteristic of the input.

It is a more limited object of this invention to provide filtering methods and structures applicable to scanning microdensitometry for recovering grain-limited information from low contrast photographic transparency records with maximum fidelity to the input.

BRIEF DESCRIPTION OF THE DRAWINGS

The features of our invention which we believe to be novel are set forth with particularity in the appended claims. Our invention itself, however, both as to its organization and method of operation, together with further objects and advantages thereof, may best be understood by reference to the following description taken in conjunction with the accompanying drawings, in which:

FIG. 2 is a schematic representation of means for vignetting correction;

FIG. 3A is a single trace of a photographic density record in terms of density vs. displacement;

FIG. 3B is a comparison of the density vs. displacement curve wherein each density range has been broken down into discrete steps and each density step assigned a write-out mode;

FIG. 3C is a specimen having the density profile of the trace of FIGS. 3A and 3B wherein density and displacement are represented in a three-element code;

The invention concerns filtering methods and structures for optical systems in general, with special attention to microdensitometric optical systems. By way of illustration, the invention is shown as being embodied in a microdensitometer apparatus described and claimed in the above-identified application of Carlton S. Miller et al. In order to better understand the nature and operation of the inventive concepts and the manner in which it improves the performance of a microdensitometer, the illustrated microdensitometer will be first described in some detail.

Figure 1:
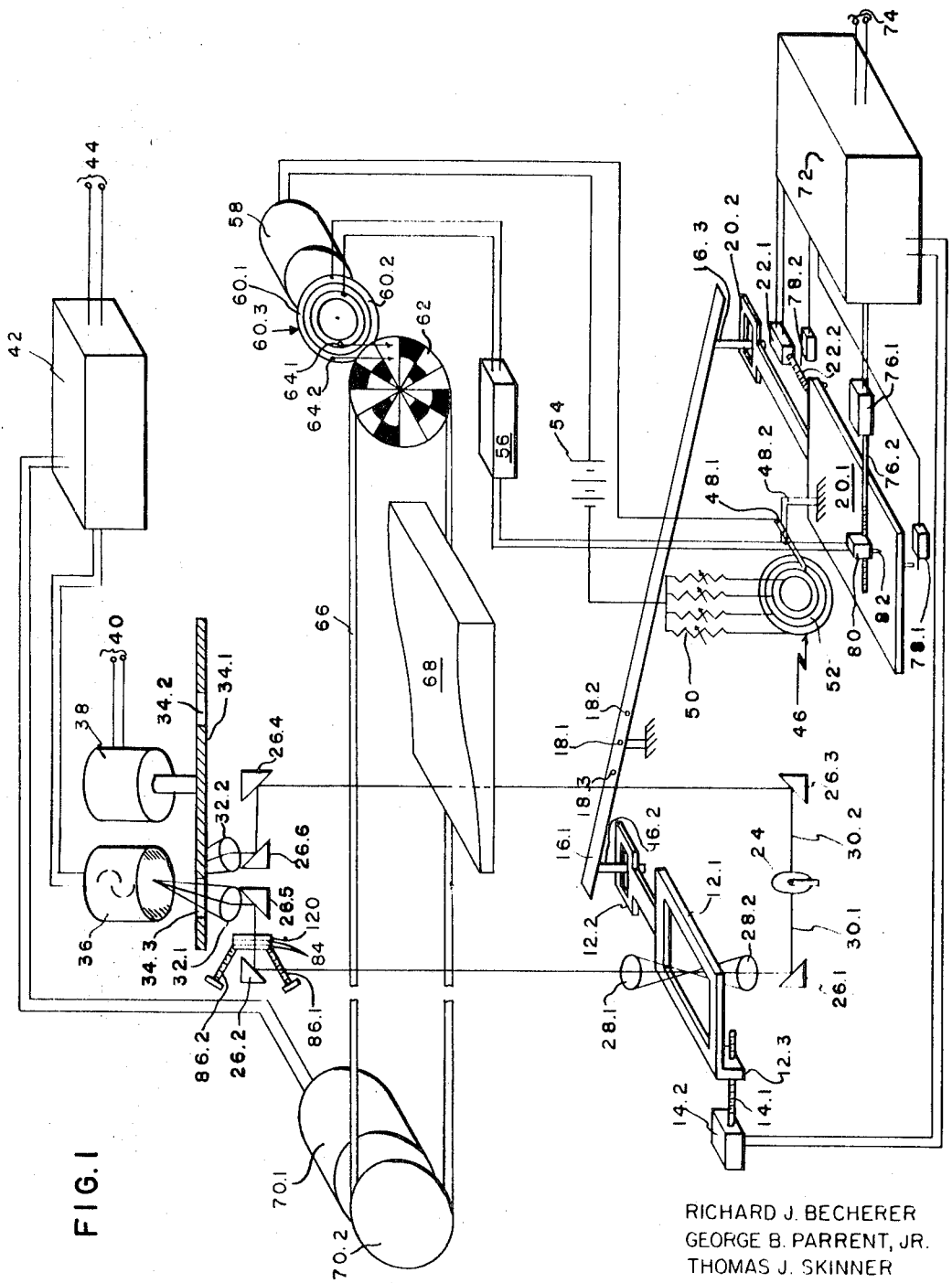
FIG. 1 is an exaggerated scale schematic view of a microdensitometer and print-out device embodying the invention.

FIG. 1 shows a microdensitometer including lenses 28.1 and 28.2 for scanning a record (not shown) which may be located in the aperture of record holder 12.1. The scanning in the X direction is accomplished by means of motor 22.1 which drives lead screw 22.2. Lead screw 22.2 is appropriately mated with write-out or recording platen 20.1 so that rotation of lead screw 22.2 causes record platen 20.1 to move in one direction. For the sake of illustration, it will be assumed that platen 20.1 is movable up and down, that is, from the top of the page to the bottom, the length of movement being determined by limit switches 78.1 and 78.2 which serve to de-energize motor 22.1 when recording platen 20.1 reaches prescribed limits.

The record holder 12.1 is linked to the write-out platen 20.1 by means of the pantagraph arm 16.1 having pins 16.2 and 16.3 located at the ends thereof. Pin 16.3 fits into the aperture in the extension 12.2 of the record holder 12.1. The pantagraph arm 16.1 is shown as pivoting about point 18.1; however, a greater or lesser magnification of the record made on platen 20.1 is possible by relocating the pivot point in apertures 18.2 or 18.3, for example.

Thus, as recording platen 20.1 is caused to move in one direction (the X direction) record holder 12.1 will also move in a corresponding direction at a reduced ratio depending upon which of the apertures (18.1, 18.2, or 18.3) is the pivot point about which the pantagraph arm rotates.

Scanning of the record holder 12.1 in the Y direction (left and right) is accomplished by means of step motor 14.2 and lead screw 14.1, which lead screw is threaded and mates in the extension 12.3 of record holder 12.1. Simultaneous with the movement imparted by motor 14.2, step motor 76.1 drives lead screw 76.2 to set the position in the Y direction of the writing pen 82 relative to the recording platen 20.1, and with it solenoid 80, which determines the writing mode of the pen. Appropriate leads couple both motors (14.2 and 76.1) to the position sensing portion of box 72 which derives its operating potential by means of terminals 74. The position sensing mechanism (not shown) provides another source of magnification in the other (i.e., the Y) direction. That is, motors 14.2 and 76.1 do not necessarily have to advance holder 12.1 and platen 20.1 the same distance but instead, if for example, motor 76.1 advances pen 82 one distance greater than the distance that motor 14.2 is advanced record holder 12.1, a magnification will be achieved of the record made on the platen 20.1 relative to the image being scanned on holder 12.1 in the Y direction.

Having now provided the relative motions in the X and Y directions for both the record holder and the recording platen, there is further provided the scanning light source system. The light is generated from source 24 and proceeds along beam paths 30.1 and 30.2. Scanning beam 30.1 is reflected off a surface of mirror 26.1, passing through lens 28.2, through the record being scanned and thence through lens 28.1. Thereafter, it proceeds to mirror 26.2 where it is again reflected to pass through an aperture defined by adjustable aperture plates 84, the dimensions and position of which may be altered by screws 86.1 and 86.2. The aperture in plates 84 acts as the effective scanning aperture of the system and sets the exact dimensions of the scanning beam 30.1 at this point in the beam path. After passing through plates 84, scanning beam 30.1 is then reflected off of mirror 26.5 whereupon it is collected and focused by lens system 32.1 on photomultiplier 36. Simultaneous with the forming of beam 30.1, beam 30.2 is formed and directed by reflection from mirror 26.3 and up through the optical density transmission, here shown as an H & D wedge 68. While the wedge has been here illustrated as a wedge having a physical dimension which changes along its length, it should be understood that this is representative of a light wedge with continuously varying shades of grey and is comparable in all respects to a photographic grey scale. The operation of wedge 68, with respect to the overall system, will be described in detail hereinafter.

Having passed through wedge 68, beam 30.2 is then reflected off mirror 26.4 and mirror 26.6 to be collected and focused by lens system 32.2 on photomultiplier 36.

Motor 38, driven by a source of 60 cycle power applied to terminals 40, is a synchronous motor driving disc 34.1 having apertures 34.2 and 34.3 located therein. The positions of apertures 34.2 and 34.3 are arranged so that each aperture will pass only one light beam. Since the motor 38 is synchronous, the pulse rate of each beam will be about 60 cycles. Thus, as the disc 34.1 rotates light beams 30.1 and 30.2 are alternatively allowed to fall on photomultiplier 36 which photomultiplier is shown having the usual dynodes therein. By providing this 60 cycle chopping action, the intensity of the beams 30.1 and 30.2 may be compared in a comparator portion of box 42 which box derives its power from a source connected to terminals 44. If the intensity of one beam is greater than the intensity of the other, an appropriate signal is fed from box 42 to servo-motor 70.1 which rotates the sheave 70.2 in an appropriate direction. Thus, if for example, beam 30.1 (the scanning beam passing through the recorded image) has a greater intensity than the beam passing through wedge 68, the signal being fed to servo-motor 70.1 is such that sheave 70.2 is rotated in a counterclockwise direction causing beam 30.2 to pass through a less dense portion of wedge 68. This shifting of wedge 68 will continue until beams 30.1 and 30.2 have equal intensities presented to photomultiplier 36, for each section of the record being scanned.

Wedge 68 is coupled to sheave 70.2 by means of belt 66 which also drives a commutator switch mechanism in the form of code wheel 62. Thus, it is seen that the point where light-beam 30.2 passes through wedge 68 will determine the position of code wheel 62. Contacts 64.1 and 64.2 are affixed to slip rings 60.1 and 60.2 respectively of contact wheel 60.3, and are movable relative to code wheel 62. The slip rings 60.1 and 60.2 have connections thereon which are connected back through coded pulsing means 56 to the solenoid 80. Depending upon the combination of spaces on code wheel 62 on which contacts 64.2 or 64.1 rest, coded pulses are sent from means 56 directing solenoid 80 to cause pen 82 to either write a "blank" (that is not write), write a series of "dots" or write a "solid" line. Thus, the scanning beam of light 30.1 passing through varying density portions of the recorded image, causes the wedge to oscillate back and forth in accordance with the changes in density of the recorded image rotating code wheel 62 which feeds information to coded pulse means 56 to determine a coded sequence that may be easily recognized as either increasing or decreasing density.

As is noted above, the wedge 68 is illustrated as an H & D wedge. This wedge is one in which the displacement of density points along the wedge follows a curve which is analogous to the H & D curve of the photographic material on which the recorded image under examination is made. We have made such wedges by exposing photographic film through a linear continuous wedge, and developing this film to the appropriate contrast to fit the H & D curve of the emulsion of the photographic material on which the recorded image under examination is made.

If no corrections have to be applied the device will perform to provide a coded density plot. However, it is frequently necessary to correct for vignetting. This is done by means of vignetting control 46 consisting of a disc 52 having concentric, circular, conductive electric conductors thereon, each conductor connected to a variable resistor 50 and all the resistors connected together and to a source of power 54. Contactor 48.1, affixed to the recording platen 20.1 by means of arm 48.2, traverses across the vignetting control disc 52. Contactor 48.1 is connected by means of a lead to servo-motor 58.

For a more detailed explanation of the operation and functioning of vignetting control 46, reference is now made to FIG. 2 wherein the contactor 48.1 is shown to traverse across the concentric conductors 52.1 along the dotted path 88. Variable resistors 50, each having one end connected to a concentric conductor and having all other ends connected to a common lead are connected to source 54 and provide means for calibrating our system for correction of vignetting. It will thus be obvious that as contactor 48.1 traverses from the bottom to the top of disc 52, for example, difference voltages are applied to servo-motor 58 (depending on the position of contactor 48.1 and recording plate 20.1) causing servo-motor 58 to step around in a given pattern, thereby correcting for any vignetting that may occur. It should be here stated that contact wheel 60.3 is mounted on the rotating shaft of servo-motor 58. In addition, code wheel 62, mounted concentrically with contact wheel 60.3, is indexed in accordance with the intensity of the beam 30.1, while servo-motor 58 causes contacts 64.1 and 64.2 on contact wheel 60.3 to be counter-rotated with respect to the code wheel 62 to compensate for the vignetting. Contactor 48.1 riding over disk 52, successively contacts each of the 60 concentric conducting rings 52.1. Potentiometers 50 are present to apply a correcting voltage to servo-motor 58. In operation, the servo-motor 58 counter-rotates the commutator 60.3 and contacts 64.1 and 64.2, which contacts determine the writing code signal applied to solenoid 80. Since the code signal applied to solenoid 80 determines the writing action of pen 82, the pen is thus caused to print in a manner to restore the losses in lens transmission occurring toward the outer edges of the field (i.e., vignetting).

Referring now to FIGS. 3A, 3B, and 3C for a pictorial representation of the code utilized in our device, it will be seen that FIG. 3A is a plot of density vs. displacement. In FIG. 3B, the density vs. displacement curve of 3A has been superimposed upon a series of horizontal coded bars. In FIGS. 3B and 3C, each coded bar occupies a space of about 0.1 (arbitrary) density units and each density unit is encoded with either a "space," a "dot," or a "line." Thus, as the curve passes through the 0 to 0.1 "space" portion, a space 92 appears in the plot 90 representing a single scan across the recorded image under examination. As the curve progresses upwardly through the "dot" portion, indicating the density ranging from 0.1 to 0.2, a series of "dots" 94 is presented on the plot. Thereafter, the curve passes through the "line" portions, as indicated by a density ranging from 0.2 to 0.3, a "line" 96 is formed in the plot 90. Thereafter, a succession of "space" 92.1, "dots" 94.1, "line" 96.1, "space" 92.2, "dots" 94.2 are all successively laid out on the plot line 90. At this point on the curve, the density decreases and returns to a point just below a density level of 0.1. In progressing back through the decreasing density encoded portion it will be seen that area 96 shows "space," "line," "dot," "space," "line," "dot," "space" until the density vs. displacement curve starts to rise again whereupon the original "space," "dot," "line" code is written, as indicated in area 98. In the following decreasing density portion of the curve at area 100, there is indicated the code having the order of "dot," "space," "line."

Figure 4:
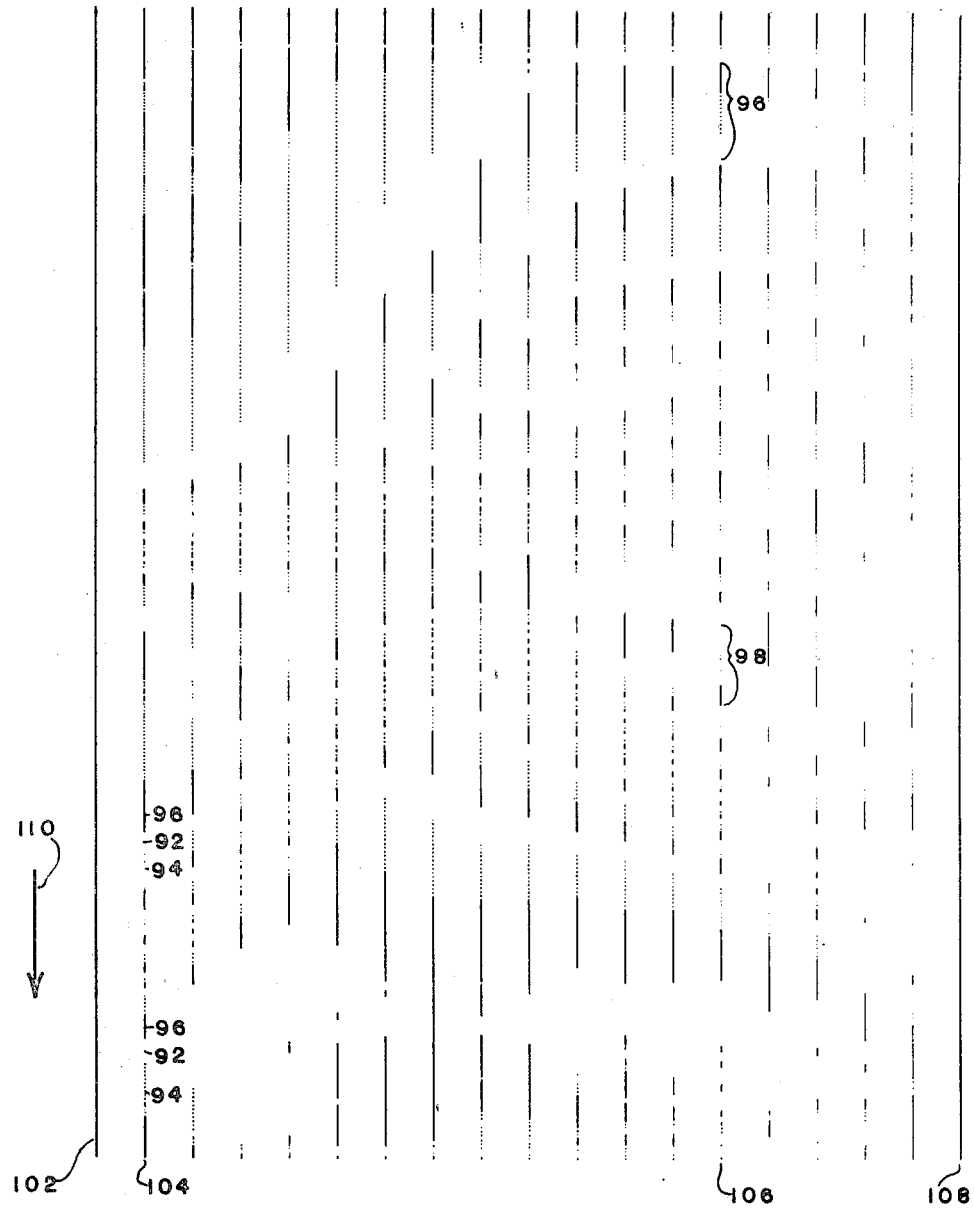
FIG. 4 is a specimen actually drawn by the disclosed device with widely separated scan lines to show the encoding.

Referring now FIG. 4 there is shown a specimen actually drawn by a system of the invention, but with widely separated scan lines to show the encoding as illustrated in FIG. 3C. In FIG. 4 it should be noted that lines 102 and 108, solid lines throughout the length of the scan, indicate the outer limits of the recorded image being scanned, with the direction of the scan being indicated by arrow 110. Referring now to line 104, there will be seen two areas where, in succession, a "line" 96, a "space" 92 and "dot" 94 are shown to indicate increasing density. Referring to scan line 106 there is shown an area 96 having a "line," "dot," "space" sequence which indicates a decreasing density as well as an area 98 having a "space," "dot," "line" sequence which indicates an increasing density. Thus, on a single line 106 there is shown both decreasing and increasing densities.

Figure 5A:
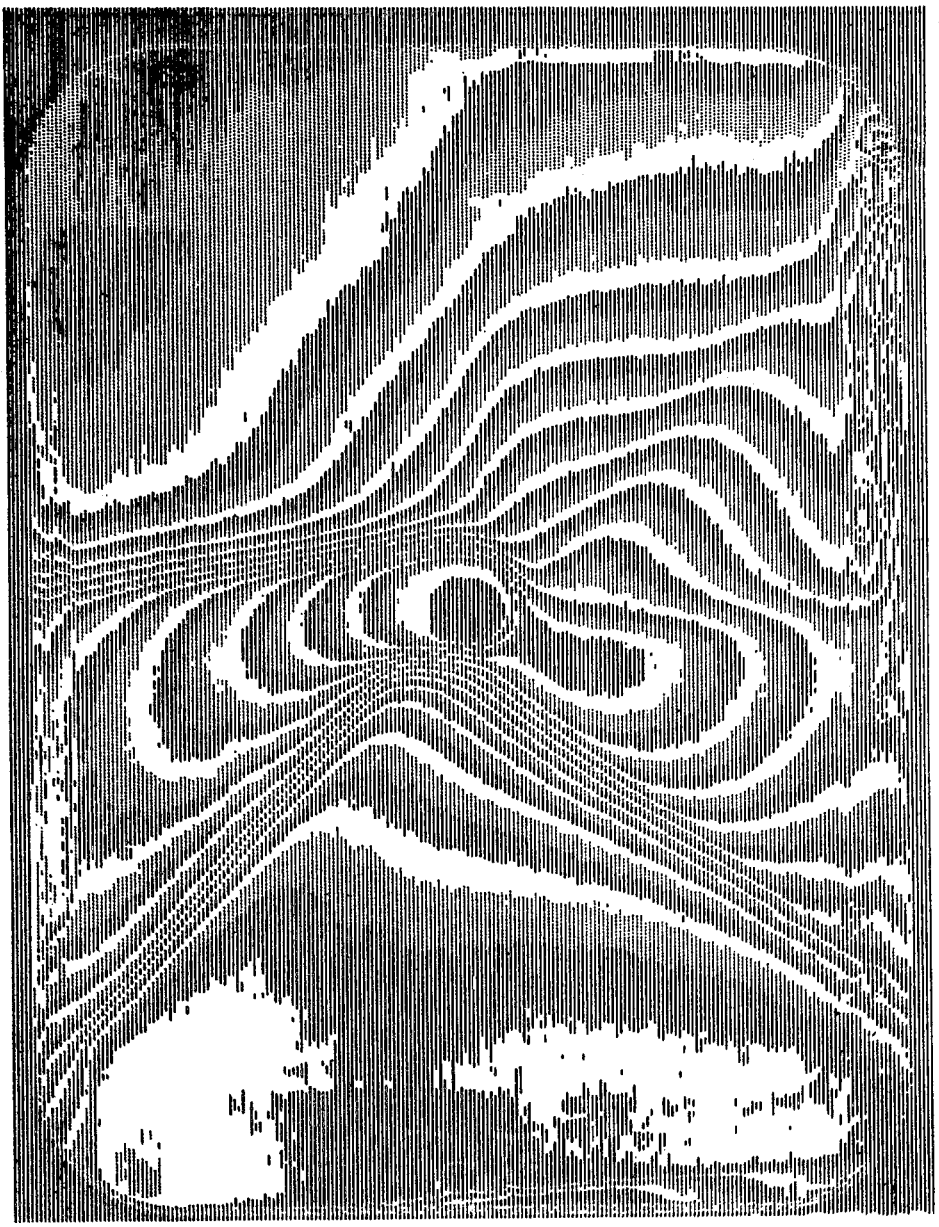
FIG. 5A is a 10× magnification of an isophote actually made by the device showing the intensity distribution of an X-ray film negative exposed through a stepped circular staircase copper attenuator in which each step was designed to attenuate about 10% of the incident radiation.

Referring now to FIG. 5A there is shown an actual drawing of the same specimen as in FIG. 4 made by a system according to the invention, with the intervening lines of FIG. 4 filled in. For the sake of clarity and for the sake of preserving this drawing as an exhibit, numbers have been omitted therefrom but, a close observation will indicate that each scan line is in fact made up of a series of "space," "dot," "line" or "line," "dot," "space" codes indicating an increasing or decreasing density, respectively.

Figure 5B:
FIG. 5B shows the actual size of the negative from which the drawing of FIG. 5A was made.
Figure 6:
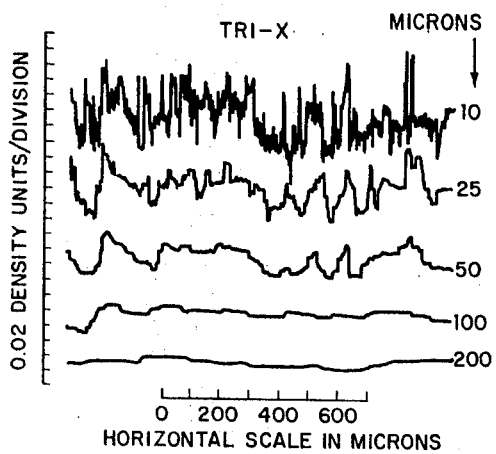
FIG. 6 shows five microdensitometer traces of Kodak (trademark) Tri–X film exposed to a continuous density wedge at a contour density step of .01 density units and at the indicated scanning aperture sizes.

Comparing FIGS. 5A and 5B there is shown in FIG. 5B the actual size of the recorded image from which FIG. 5A was made. This is included to show that magnification is possible both along the length and along the width of the image (i.e., in the X and Y directions). As will be apparent, however, from the foregoing description, magnificaton in each direction can be achieved independently of magnification, or lack of magnification in the other direction.

The theory on which the invention is predicated is very broad, as will become evident, and may be used to derive optimum filters in accordance with many of the linear an nonlinear filtering theories developed especially in the electrical arts. In this application we are most interested in pursuing the filtering theories of Norbert Weiner to derive optimum linear filters for minimizing the mean-square deviation of an achievable output from a sought output. By way of illustration only, a filter is described in detail herein which is designed to give an output with "high fidelity" to the input signal (the record).

A photographic material may be described in terms of its Fourier spectrum. If the material is described by its spectrum, both the signal (the imagery) and the noise (the grain) can be treated as an aggregate of various spatial frequency components. At some spatial frequencies the signal is much stronger than the noise, and at other frequencies the opposite is true. Our implementation of this invention involves the provision of a filter having a varying transmittance function for "shading" the effective scanning aperture of a microdensitometer optical system. The filter has the effect of attenuating those spatial frequencies at which the noise is stronger than the signal to a greater degree than those frequencies at which the signal is stronger than the noise. The effect of the filter on the average is to enhance the signal with respect to the grain noise.

It is, of course, true that the filter will not be equally beneficial in all cases of signal and noise. The best results will be obtained when the signal and grain noise have quite dissimilar spectra, i.e., when the noise is weak at those spatial frequencies where the signal is strong and vice versa.

One of the principal limitations faced by the photo-interpreter in extracting geometric and photometric information from photographic records is the irregular structure of the photographic grain. The finite size of these grains is not the limiting factor in resolution; it is rather the randomness or unpredictability of the grain locations and shapes that causes loss of information. Since grain is a random phenomenon we must treat it using statistical techniques.

Certain simple statistical relations have been developed and used in the past to describe grain noise. Although these relations do not lead to any prescription for attenuating the noise level relative to the signal we will describe them briefly. A description of grain will be set forth below which is completely general; it will be found that the relations used in the past, to be described, are but special cases of our more general expressions.

The relations used in early attempts to describe grain noise defined the root-mean-square value of the density or transmittance of the medium under analysis. In particular, the Selwyn granularity coefficient, described in Phot. J. 79, 571 (1935), was defined to be proportional to the R.M.S. value of the density readings obtained in a microdensitometer trace across a uniformly exposed piece of film, i.e., $$S = \sqrt{2A}\sigma_D$$

where A is the area of the scanning aperture used in tracing the film and $\sigma_D$ is the R.M.S. value or standard deviation of the density. Selwyn claimed that the parameter S is a constant for any particular film type. It was later shown experimentally by L. A. Jones and G. C. Higgins in J. Opt. Soc. Am. 36, 203 (1946), that this is not true in general. The parameter S is constant only for scanning apertures much larger than the grain size.

Goetz and Gould in J. Soc. Motion Picture and Television Engrs. 29, 510 (1937), defined a granularity coefficient as $$G = 1000\sqrt{2}\sigma_T$$

where $\sigma_T$ is the standard deviation, i.e., R.M.S. value, of the transmittance fluctuations. They suggested that this coefficient multiplied by the square root of the area of the scanning aperture might be a constant for any particular film. Jones and Higgins also demonstrated by experiment that this was not accurate except under special conditions.

Note that these relations each exhibit an ultimate dependence on the area of the scanning aperture. We will derive an expression for grain effects which is dependent upon the characteristics of the film alone and not on the measuring methods or structures.

It was suggested by P. Fellgett (J. Opt. Soc. Am. 43, 271) and Elias (J. Opt. Soc. Am. 43, 229) and shown by Jones (J. Opt. Soc. Am. 45, 799) and Sweig (J. Opt. Soc. Am. 46, 805) that a better way to describe granularity is by the autocorrelation function and Wiener spectrum of the film transmittance. It will be shown below that the same information is contained in both the correlation function and Wiener spectrum, but in different forms. The advantage of this description over the simple R.M.S. fluctuation parameters S and G is that the Wiener spectrum description leads, inter alia, to a method for suppressing the noise and enhancing the signal. Also, this description shows how the granularity changes when imaging or scanning systems are employed to measure the fluctuations in transmission. The use of the autocorrelation function and Wiener spectrum provides a description which is an essentially intrinsic property of the film—in other words, it does not depend on the measuring instrument.

The method of obtaining the autocorrelation function of the film transmittance fluctuations is as follows. The fluctuation $t(\xi, \eta)$ of transmittance T in Cartesian coordinates $\xi, \eta$ $$t(\xi, \eta) = T(\xi, \eta) - \overline{T} \tag{1}$$

is the actual film transmittance variation from the mean level $\overline{T}$. The autocorrelation function of these fluctuations is defined to be $$\phi(x, y) = \overline{t(\xi, \eta)t(\xi+x, \eta+y)} \tag{2}$$

where the overbar represents an averaging operation and where x, y are the correlation coordinates in the $\xi, \eta$ plane.

It can be seen that Equation 2 defines the correlation function as an average of the product of the transmittance values at two points separated by the distance x and y. We can get a qualitative feel for the meaning of this function in the following way. We expect that, when the correlated points are very close together, the two values of $t$ will increase and decrease together. Thus, when one transmittance value goes negative (relative to the mean $\overline{T}$) the other will also, and the product will again be positive, thus adding to the average. However, as the correlated points diverge, they may assume opposite polarity (resulting in a negative product), and the product may average to zero. Thus, intuitively, it is evident that the correlation function will have a maximum at the origin; i.e., at $x=0$, and $y=0$, and will drop to zero for very large values of x and y. It has been shown mathematically that these are, in fact, the properties of the correlation function. See "Stastistical Theory of Communication," Y. W. Lee (New York, N.Y., John Wiley and Sons, Inc., 1960), pp. 73–74.

We can see at this point that Selwyn's granularity coefficient can be obtained from $\phi(0, 0)$ since $$\begin{aligned}\phi(0, 0) &= \overline{t(\xi, \eta)t(\xi, \eta)} \\ &= \overline{(T(\xi, \eta) - \overline{T})^2} \\ &= \sigma^2_T \end{aligned} \tag{3}$$

by the definition of $\sigma_T$. However, note that the value $\phi(0, 0)$ does not depend on the properties of the aperture used to measure it. We will see shortly how the effect of the scanning aperture is removed.

Since we can obtain Selwyn's granularity coefficient from a special case of the correlation function, then the simple parameters S and G, defined earlier, contain less information about the grain than does the correlation function $\phi(x, y)$.

The Wiener spectrum is defined to be the Fourier transform of the auto-correlation function (see "Introduction to Statistical Optics," E. L. O'Neill (Addison-Wesley Pub. Co., Reading, Mass., 1963), p. 18:

$$\Phi(\omega_x, \omega_y) = \int_{-\infty}^{\infty}\int \phi(x, y)e^{-i(\omega_x x + \omega_y y)}dxdy \tag{4}$$

Since any optical transfer system can be treated as a linear filter of spatial frequencies, it is desirable to consider the effect of the scanning aperture (formed in plates 84 in FIG. 1) and the attendant optical system on the *measured* correlation function and thus on the corresponding Wiener spectrum.

Two convolution operations occur between the input (the record) and the microdensitometer output (the electrical signal generated at the output of the photomultiplier 36). First, the spread function (or impulse response of the optical channel including the imaging element is convolved with the record function, this spread function being determined largely by the numerical aperture of the microscope objective lens 28.1. Secondly, the image of the scanned record elements formed in the imaging system at the plane of the scanning aperture is convolved with the scanning aperture itself. The latter convolving or smoothing operation may be thought of as a convolution of a scanning spread function $S(\alpha, \beta)$ (defining the output when an impulse input is scanned by a finite aperture) with the aperture transmittance. The spreading effect caused by the scanning aperture on the optical transfer is much more severe than the effect of the impulse response of the imaging system—hence, the latter effect may be disregarded.

The film transmittance is effectively convolved with this spread function $S(\alpha, \beta)$ to produce a measured transmittance $t'(\alpha, \beta)$ given by $$t'(\alpha, \beta) = \int_{-\infty}^{\infty}\int t(\xi, \eta)S(\alpha-\xi, \beta-\eta)d\xi d\eta \tag{5}$$

If we substitute this last relation between the actual and the measured transmittance in the expression for $\phi(x, y)$ given above, and then take the Fourier transform of the resulting expression, we find that $$\Phi'(\omega_x, \omega_y) = \Phi(\omega_x, \omega_y)|H(\omega_x, \omega_y)|^2 \qquad (6)$$

Equation 6 defines the connection between the actual or intrinsic Wiener spectrum of the grain noise on the film and the measured noise Wiener spectrum. The measured quantity is denoted by the prime superscript. The function $H(\omega_x, \omega_y)$ is the transfer function of the scanning system and is also the Fourier transform of the spread function $S(\alpha, \beta)$.

This last relation can be interpreted as follows: At each spatial frequency $(\omega_x, \omega_y)$ the intrinsic Wiener spectrum of the grain noise is multiplied by an attenuation factor $|H(\omega_x, \omega_y)|^2$. This attenuation factor is determined uniquely by the scanning aperture spread function $S(\alpha, \beta)$. *Thus, by changing the configuration and transmission functions of the scanning aperture, the Wiener spectrum represented at the output of the photomultplier 36 is changed.* It is also been found that, on the average, the fidelity of individual traces is improved. The essence of this invention centers on this concept. In accordance with the teachings of this invention we provide a filter 120 as nearly as possible in the plane of the scanning aperture which will have the effect of producing a distribution in frequency space which corresponds to the optimum Wiener spectrum for the selected film and signal, that is (in the illustrated case) a spectrum wherein those frequencies at which the noise is strong relative to the signal are attenuated more than those frequencies at which the signal is predominant.

We have provided a background for a determination of the transmittance function of a scanning aperture optimized for the reduction of noise versus signal for a given photographic film signal. In accordance with this invention, we will now determine the filter function for shading the effective scanning aperture to minmize the mean square error between the output of the scanning microdensitometer and the object (or signal) as it would appear if there were no noise present—that is, a shading filter that smooths out grain noise in such a way that there is the least geometric and photometric distortion of the object signal due to grain fluctuations.

This criterion for designing the optimum filter can be expressed mathematically. The mean square error that we seek to minimize is $$\epsilon^2 = |t'(\alpha, \beta) - A(\xi, \eta)|^2 \qquad (7)$$

where $t'(\alpha, \beta)$ is the measured or output transmittance of the microdensitometer in the coordinates $\alpha, \beta$ of the output plane and $A(\xi, \eta)$ is the signal part of the film transmittance in coordinate $\xi, \eta$ defining the input (record) plane. The present method of designing the optimum aperture shading filter 120 is dependent on the total transmittance of the film $T(\xi, \eta)$ being a sum of the signal transmittance $A(\xi, \eta)$ and the grain noise transmittance $N(\xi, \eta)$. This can be written $$T(\xi, \eta) = A(\xi, \eta) + N(\xi, \eta) \qquad (8)$$

This type of noise is commonly referred to as additive noise. There have been some objections to the idea of grain noise being represented as additive. Frequently, those who suggest that grain noise is not additive have actually meant to say that grain noise is not independent of the signal. It is in general true that the granularity in any small area of the film depends on the local signal level. This has been shown experimentally. However, this in itself does not show that an additive representation is wrong. In general, we regard the grain noise as being added to the signal but correlated with the signal. Then the dependence of granularity on local signal level is expressed by the strength of the cross-correlation of signal with noise.

The mathematical derivation of the form of the Wiener filter function is well known (see, for example, the above-referenced text on communication theory by Y. W. Lee). We simply present here the final result. The optimum Wiener filter that would minimize the mean square error $\epsilon^2$, defined above, has the general form $$H_{opt}(\omega) = \frac{\Phi_{SS}(\omega) + \Phi_{SN}(\omega)}{\Phi_{SS}(\omega) + \Phi_{NN}(\omega) + 2\Phi_{SN}(\omega)} \qquad (9)$$

where $\Phi_{SS}(\omega)$ is the Wiener spectrum of the signal $$\Phi_{NN}(\omega)$$

is the Wiener spectrum of the noise, and $\Phi SN(\omega)$ is the cross-spectrum of signal and noise.

If we assume that the analyzed imagery has relatively low contrast, we can expect the noise to be relatively uncorrelated with the local signal level since the signal level does not deviate much from the overall average level. The Wiener spectrum of the noise $\Phi_{NN}(\omega)$ in this case is the Wiener spectrum appropriate for the mean signal level, and the cross-spectrum $\Phi_{NS}(\omega)$ is negligibly small. For this low contrast case we then find that the optimum Wiener filtered spectrum is $$H_{opt}(\omega) = \frac{\Phi_{SS}(\omega)}{\Phi_{SS}(\omega) + \Phi_{NN}(\omega)} \qquad (10)$$

It can be seen that when the noise spectrum is much less than the signal spectrum at all frequecies, $H_{opt}(\omega) = 1$ (all frequencies have equal intensity). On the other hand, when the signal is much less than the noise, then the signal spectrum in the denominator of the expression for $H_{opt}(\omega)$ can be neglected compared to the noise spectrum. Then $H_{opt}(\omega) = \Phi_{SS}(\omega)/\Phi_{NN}(\omega)$.

Figure 7:
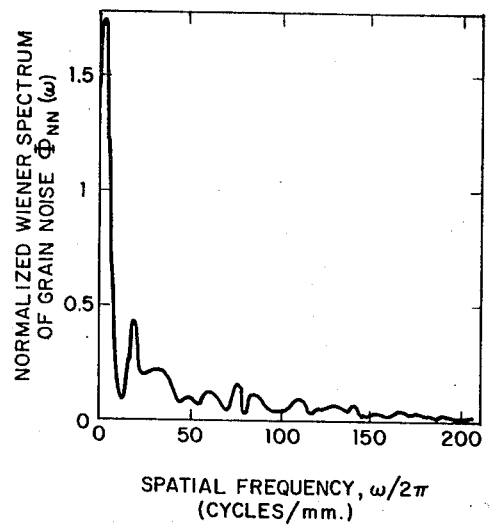
FIG. 7 is a graph showing a normalized Weiner spectrum of grain noise for EK–8430 film.

A determination of the intrinsic noise spectrum $\Phi_{NN}(\omega)$ must begin with an ascertainment of the measured noise spectrum $\Phi_{NN}(\omega)$. The measured noise spectrum $\Phi'_{NN}(\omega)$ may be determined experimentally. In order to remove the effect of the scanning aperture used in the experiment to determine $\Phi'_{NN}(\omega)$, and thus find the intrinsic noise spectrum $\Phi_{NN}(\omega)$ of the test film, the measured Wiener spectrum of the noise is divided by the square of the magnitude of the scanning aperture transfer function. This division is performed in the spatial frequency domain and is represented mathematically by $$\Phi_{NN}(\omega) = \frac{\Phi'_{NN}(\omega)}{\dfrac{2J_1(\omega a)^2}{\omega a}} \qquad (11)$$

where $J_1$ is the Bessel function of first order and "$a$" is the radius of the circular scanning aperture used in making the traces. Since the function $J_1(\omega a)$ goes to zero at $\omega = 3.83/a$, we are actually limited to recovering the intrinsic noise spectrum for the spatial frequencies below $\omega = 3.83/a$. In practice, this just means that an aperture must be picked with a radius small enough so that $\omega = 3.83/a$ is larger than the effective spatial frequency limit of the intrinsic noise spectrum. The intrinsic noise spectrum $\Phi_{NN}(\omega)$ for Eastman Kodak 8430 film is shown in FIG. 7.

Figure 8:
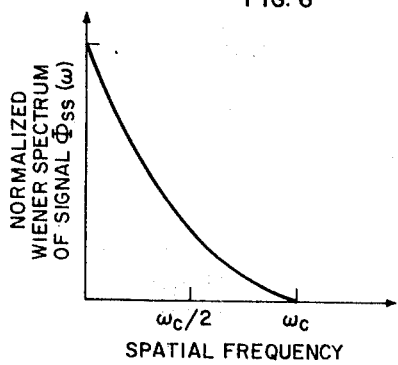
FIG. 8 is a graph showing a normalized hypothetical Weiner signal spectrum.

The signal Wiener spectrum $\Phi_{SS}(\omega)$ is now determined from knowledge of the general class of scenes that we wish to consider. The first physical requirement on this class of scenes is that it be band-limited; i.e., have a signal Wiener spectrum that decreases to zero at some finite spatial frequency. In practice, this frequency is determined by the spatial frequency limit of the photographic imaging system. The objective lens itself has a cutoff at a spatial frequency equal to $2NA/\lambda$ where NA is the numerical aperture of the taking lens system and $\lambda$ is the mean wavelength of the light. The second physical requirement is that there not be any preferred direction in the signal Wiener spectrum. A normalized signal Wiener spectrum might appear as shown in FIG. 8.

The optimum Wiener filter spectrum $H_{opt}(\omega)$ is obtained by inserting the functions $\Phi_{SS}(\omega)$ and $\Phi_{NN}(\omega)$ in Equation 10. As explained above, the filter 120 with which this invention is concerned is not located in frequency space but is located in the first image plane of the microscope objective 28.1 and juxtaposed with the effective scanning aperture (defined by plates 84) for introducing a variable transmission function across at least a portion of the scanning aperture.

The actual optimum aperture shading filter function $h_{opt}(r)$ is given by the Fourier-Bessel transform of $H_{opt}(\omega)$, i.e., $$h_{opt}(r) = \frac{1}{2\pi} \int_0^\infty H_{opt}(\omega) J_0(\omega r) \omega d\omega \qquad (12)$$

Figure 9:
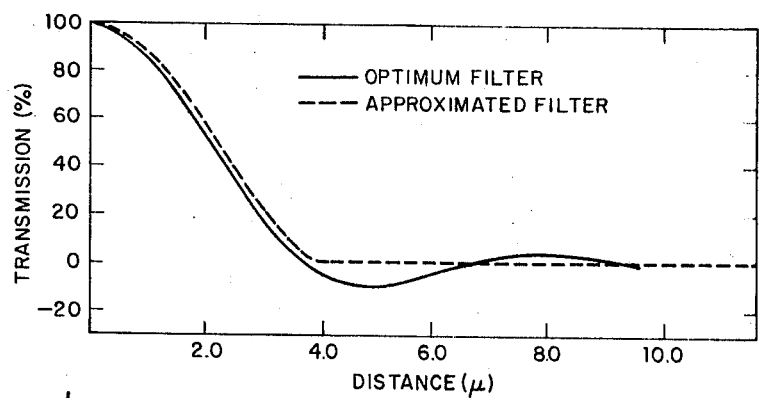
FIG. 9 depicts optimum and approximated aperture shading filter functions useful for optimizing output fidelity given an input signal having the FIG. 8 spectrum and grain noise having the spectrum shown in FIG. 7.
Figure 10:
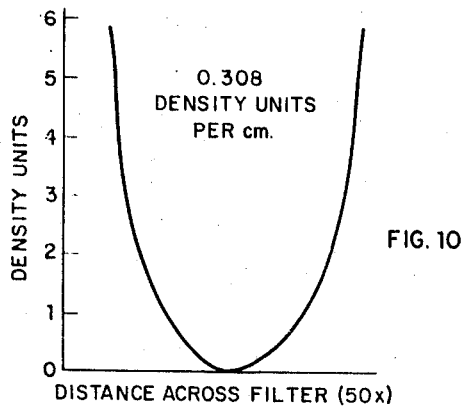
FIG. 10 illustrates a density-distance function of a filter constructed to yield the approximated transmittance function curve shown in FIG. 9.

Equation 12 is easily solved by conventional computer techniques. The form of the optimum shading filter function $h_{opt}(r)$ for producing an output with high fidelity to the input with EK 8430 film and a hypothetical signal input having the FIG. 8 spectrum is shown in FIG. 9. Note that the optimum scanning aperture filter function should have negative intensity transmittance in one region. This is, of course, not possible to achieve. All apertures that can be realized must have an intensity transmittance between zero and unity. Therefore, approximation to the optimum filter is made, as shown by the dashed line trace in FIG. 9. The excluded regions actually represent a relatively small contribution to the total transmittance of the aperture in terms of energy, and the error introduced by the elimination of these regions is therefore relatively small. We have found that using a filter function approximated as shown in FIG. 8, a filter is obtained which produces near optimum results. A filter having the FIG. 8 transmission optimum shaded aperture function may be produced photographically. The density-distance function of the filter is as shown in FIG. 10.

It has been found that with a scanning aperture shading filter 120 fabricated as described above and having a transmittance function which represents substantially a Fourier transformation of the optimum "high fidelity" Wiener filter function for a given film, record signal, and other relevant parameters, the microdensitometer output showed significant improvement in the rendition of higher spatial frequency information, straighter edge definition, and less edge smearing than could be obtained with the same microdensitometer apparatus not provided with one of our aperture shading filters.

We wish to emphasize that the above-described implementation of the invention is an extremely limited application of the broad principles underlying this invention. We have described a filter having a very specific function, namely, to maximize the fidelity of the output signal to the input signal, which is derived using Wiener filtering criterion. Other families of filters would emerge using Wiener criterion (minimization of the mean square error between a desired output and an actual output) if, for example, the desired output were in the form of a derivative of the input signal. Wiener filtering is in turn but one of many filtering criterions, both linear and nonlinear, which might be used in the application of this invention. Other optimization criterion would produce a different prescription for the formation of shading aperture filters. For example, if instead of using the Wiener criterion, we use the criterion of minimizing the mean value of the fourth power of the deviation of an actual output from a desired output, then an entirely different set of filters would be obtained for the same desired output.

We have illustrated the use of a particular filter in a microdensitometer coupled to a dropped-line printout device; the filters derived in accordance with this invention are equally efficacious when appplied to any microdensitometer.

Rather than forming the filter as a pure silver density image, the filter might be formed as a variable density dye image in order that spectral, as well as geometric and photometric, information might be retrieved from an input record.

The invention is not limited to the particular details of construction of the embodiments depicted, and it is contemplated that various and other modifications and applications will occur to those skilled in the art. Therefore, because certain changes may be made in the above-described methods and structures without departing from the true spirit and scope of the invention herein involved, it is intended that the subject matter of the above depiction shall be interpreted as illustrative and not in a limiting sense.

What is claimed is:

1. In a scanning microdensitometer, the combination comprising:
    incremental scanning means for making a physical point-by-point scan of an optical record;
    photodetecting means coupled to said scanning means for detecting a particular optical characteristic of the record and producing an electrical output signal indicative of spatial variations in said characteristic, said photodetecting means comprising:
        light source means for illuminating the record,
        an optical imaging system having an optical axis forming an image of an illuminated element of the record at a record image plane,
        mask means located at said record image plane for defining a scanning aperture acting effectively to delimit the field of view of said optical imaging system,
        photoresponsive means for sensing the integrated light intensity distribution in said scanning aperture and for producing said output signal, and
        a spatial filter located in said optical imaging system on said optical axis substantially at said scanning aperture, said filter having a radially symmetric transmittance filtering function for altering a parameter of an optical input to said filter.

2. The apparatus as defined by claim 1 wherein said optical characteristic of said record which is detected is transmittance and wherein said filtering function represents a Fourier transformation of a frequency distribution optimized in accordance with a predetermined filtering criterion.

3. The apparatus defined by claim 2 wherein said filtering criterion is to minimize the mean square deviation of an actual output from a desired output.

4. A method of microdensitometry comprising:
    illuminating a record to be analyzed;
    incrementally scanning the record point-by-point;
    photodetecting a particular optical characteristic of the scanned record by forming an image of an illuminated element of the record at a record image plane on an optical axis, locating at said record image plane and on said optical axis a mask defining a scanning aperture acting effectively to delimit said image of said element, and sensing the integrated light intensity distribution in said scanning aperture;
    imposing a predetermined spatially varying radially symmetric transmittance filtering function at said scanning aperture and or said optical axis; and
    producing an output signal characterizing spatial variations in said record characteristic which is altered by the effect of said filtering function.

5. A method as defined in claim 4 wherein said step of imposing comprising imposing a filtering function representing a Fourier transformation of a frequency distribution optimized in accordance with a predetermined filtering criterion.

6. A method as defined in claim 5 wherein said step of imposing comprises imposing a filtering function which minimizes the mean square deviation of an actual output from a desired output.

References Cited

UNITED STATES PATENTS

| | | | |
|---|---|---|---|
| 2,959,105 | 11/1960 | Sayanagi | 350—62 |
| 3,392,623 | 7/1968 | Walker et al. | 346—33 Opt-UX |
| 3,424,534 | 1/1969 | Miller et al. | 346—33 Opt-UX |
| 3,012,466 | 12/1961 | Wiebe | 356—203 |
| 3,240,108 | 3/1966 | Lehan et al. | 356—71 |
| 3,244,062 | 4/1966 | Sweet | 356—203 |
| 3,305,834 | 2/1967 | Cooper et al. | 356—71X |
| 3,342,539 | 9/1967 | Nelson et al. | 356—71X |
| 3,370,268 | 2/1968 | Dobrin et al. | 350—162(SF) |
| 3,424,512 | 1/1969 | Ingalls | 356—71X |
| 3,435,244 | 3/1969 | Burckhardt et al. | 356—71X |
| 3,437,824 | 4/1969 | Lohmann | 356—71X |
| 3,439,155 | 4/1969 | Alexander | 356—71X |

OTHER REFERENCES

Lugt, Optica Acta, 1968, vol. 15, No. 1, pp. 1–33.

Kelly, J.O.S.A., vol. 51, No. 10, October 1961, pp. 1095–1101.

Thiry, Applied Optics, January 1964, vol. 3, No. 1, pp. 39–43.

Cutrona et al., Proc. Natl. Elec. Conf., vol. XV, October 1959, pp. 1–4.

RONALD L. WIBERT, Primary Examiner

W. A. SKLAR, Assistant Examiner

U.S. Cl. X.R.

250—224; 350—162